US008244752B2

(12) United States Patent
Buehrer et al.

(10) Patent No.: US 8,244,752 B2
(45) Date of Patent: Aug. 14, 2012

(54) CLASSIFYING SEARCH QUERY TRAFFIC

(75) Inventors: Greg Buehrer, Bothell, WA (US); Kumar Chellapilla, Redmond, WA (US); Jack W. Stokes, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 12/106,857

(22) Filed: Apr. 21, 2008

(65) Prior Publication Data

US 2009/0265317 A1 Oct. 22, 2009

(51) Int. Cl.
*G06F 7/00* (2006.01)
*G06F 17/30* (2006.01)
*G06F 11/00* (2006.01)
*G06F 12/14* (2006.01)
*G06F 12/16* (2006.01)
*G08B 23/00* (2006.01)

(52) U.S. Cl. .......................................... 707/769; 726/22
(58) Field of Classification Search .................. 707/771, 707/769; 726/22; 709/23
See application file for complete search history.

(56) References Cited

U.S. PATENT DOCUMENTS

| 7,299,496 | B2 | 11/2007 | Frieder et al. | |
|---|---|---|---|---|
| 7,657,626 | B1* | 2/2010 | Zwicky | 709/224 |
| 7,743,045 | B2* | 6/2010 | Guha | 707/706 |
| 2003/0167187 | A1* | 9/2003 | Bua | 705/2 |
| 2003/0216930 | A1* | 11/2003 | Dunham et al. | 705/1 |
| 2004/0117654 | A1* | 6/2004 | Feldman et al. | 713/201 |
| 2004/0177081 | A1* | 9/2004 | Dresden | 707/100 |
| 2005/0144067 | A1 | 6/2005 | Farahat et al. | |
| 2006/0122979 | A1* | 6/2006 | Kapur et al. | 707/3 |
| 2006/0184500 | A1* | 8/2006 | Najork et al. | 707/1 |
| 2007/0112730 | A1 | 5/2007 | Gulli et al. | |
| 2007/0220607 | A1* | 9/2007 | Sprosts et al. | 726/24 |
| 2007/0255821 | A1 | 11/2007 | Ge et al. | |
| 2007/0276790 | A1 | 11/2007 | Walsh et al. | |
| 2008/0010166 | A1 | 1/2008 | Yang et al. | |
| 2008/0040324 | A1* | 2/2008 | Sadri et al. | 707/3 |
| 2008/0120413 | A1* | 5/2008 | Mody et al. | 709/226 |
| 2008/0222134 | A1* | 9/2008 | Krishnamurthy | 707/5 |
| 2008/0301090 | A1* | 12/2008 | Sadagopan et al. | 707/3 |

FOREIGN PATENT DOCUMENTS

WO WO2008030670 A1 3/2008

OTHER PUBLICATIONS

Schluessler et al. "Is a Bot at the Controls? Detecting Input Data Attacks." Netgames 07, Sep. 19-20, 2007.*
Tan et al. "Discovery of Web Robot Sessions Based on their Navigational Patterns." Data Mining and Knowledge Discovery, 2002.*

(Continued)

*Primary Examiner* — Charles Lu
(74) *Attorney, Agent, or Firm* — The Law Office of Michael E. Kondoudis

(57) ABSTRACT

A method for classifying search query traffic can involve receiving a plurality of labeled sample search query traffic and generating a feature set partitioned into human physical limit features and query stream behavioral features. A model can be generated using the plurality of labeled sample search query traffic and the feature set. Search query traffic can be received and the model can be utilized to classify the received search query traffic as generated by a human or automatically generated.

18 Claims, 9 Drawing Sheets

OTHER PUBLICATIONS

OneStat Enterprise, "The Ultimate Enterprise on Demand Web Analytics Solutions for High Volume Websites", http://www.onestat.com/html/os_enterprise.html, accessed Apr. 8, 2008.

Pietikäinen et al., "Behavior Study of Bot Obedience using Causal Relationship Analysis", 18th Annual First Conference, Jun. 25-30, 2006.

Venkataraman et al., "New Streaming Algorithms for Fast Detection of Superspreaders", In Proceedings of Network and Distributed System Security Symposium (NDSS), Feb. 2005.

Agichtein et al., "Learning User Interaction Models for Predicting Web Search Result Preferences", Proceedings of the 29th Annual International ACM SIGIR Conference on Research and Development in Information Retrieval, SIGIR '06, Aug. 6-11, 2006.

Peter Anick, "Using Terminological Feedback for Web Search Refinement—A Log-based Study", Proceedings of the 26th Annual International ACM SIGIR Conference on Research and Development in Information Retrieval, SIGIR '03, Jul. 28-Aug. 1, 2003.

Thorsten Joachims, "Optimizing Search Engines Using Clickthrough Data", Proceedings of the Eighth ACM SIGKDD International Conference on Knowledge Discovery and Data Mining, KDD '02, Jul. 23-26, 2002.

Joachims et al., "Accurately Interpreting Clickthrough Data as Implicit Feedback", Proceedings of the 28th Annual International ACM SIGIR Conference on Research and Development in Information Retrieval, SIGIR '05, Aug. 15-19, 2005.

Kamvar et al., "A Large Scale Study of Wireless Search Behavior: Google Mobile Search", Proceedings of the SIGCHI Conference on Human Factors in Computing Systems, CHI '06, Apr. 22-27, 2006.

Fetterly et al., "Spam, Damn Spam, and Statistics", Seventh International Workshop on the Web and Databases (WebDB 2004), Jun. 17-18, 2004.

Click Quality Team, "How Fictitious Clicks Occur in Third-Party Click Fraud Audit Reports", Google, Inc., Aug. 8, 2006.

Daswani et al. "The Anatomy of Clickbot.A", In Proceeding HotBots'07 Proceedings of the First Conference on First Workshop on Hot Topics in Understanding Botnets, Apr. 10, 2007.

Karasaridis et al., "Wide-scale Botnet Detection and Characterization", In Proceeding HotBots'07 Proceedings of the First Conference on First Workshop on Hot Topics in Understanding Botnets, Apr. 10, 2007.

Alexander Tuzhilin, "The Lane's Gifts v. Google Report", http://googleblog.blogspot.com/pdf/Tuzhilin_Report.pdf, Jul. 2006.

Wu et al., "SpeedTracer: A Web Usage Mining and Analysis Tool", IBM Systems Journal, vol. 37 Issue 1, 1998.

* cited by examiner

CLASSIFYING SEARCH QUERY TRAFFIC

BACKGROUND

The internet (or web) has quickly become a popular way for general information gathering. As web search providers seek to improve both relevance and response times for human users, they are challenged by the ever-increasing tax of automated search query traffic. It is pointed out that automated third party systems interact with web search engines for a variety of reasons, such as monitoring a website's rank, augmenting online games, or possibly to maliciously alter click-through rates. Note that automated search traffic is of significant concern to web search providers because it hampers the ability of large scale systems to run efficiently, and it lowers human user satisfaction by hindering relevance feedback. Because web search engines are open for public consumption, there are many automated systems which make use of the service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for classifying search query traffic can involve receiving a plurality of labeled sample search query traffic and generating a feature set partitioned into human physical limit features and query stream behavioral features. A model can be generated using the plurality of labeled sample search query traffic and the feature set. Search query traffic can be received and the model can be utilized to classify the received search query traffic as generated by a human or automatically generated.

Such a method for classifying search query traffic can enable large scale systems of web search providers to run more efficiently and also improve their human user satisfaction. In this manner, the services provided by web search providers can be enhanced.

DETAILED DESCRIPTION

Reference will now be made in detail to embodiments of the present technology for classifying search query traffic, examples of which are illustrated in the accompanying drawings. While the technology for classifying search query traffic will be described in conjunction with various embodiments, it will be understood that they are not intended to limit the present technology for classifying search query traffic to these embodiments. On the contrary, the presented embodiments of the technology for classifying search query traffic are intended to cover alternatives, modifications and equivalents, which may be included within the scope of the various embodiments as defined by the appended claims. Furthermore, in the following detailed description, numerous specific details are set forth in order to provide a thorough understanding of embodiments of the present technology for classifying search query traffic. However, embodiments of the present technology for classifying search query traffic may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the detailed description, discussions utilizing terms such as "detecting", "retrieving", "identifying", "classifying", "receiving", "generating", "determining", "performing", "building", "utilizing", "extracting", "processing", "presenting", "modifying", "changing", "altering", "producing", "outputting", or the like, refer to the actions and processes of a computer system (such as computer 100 of FIG. 1), or similar electronic computing device. In one embodiment, the computer system or similar electronic computing device can manipulate and transform data represented as physical (electronic) quantities within the computer system's registers and/or memories into other data similarly represented as physical quantities within the computer system memories and/or registers or other such information storage, transmission, or display devices. Some embodiments of the present technology for classifying search query traffic are also well suited to the use of other computer systems such as, for example, optical and virtual computers.

Example Computer System Environment

Figure 1:
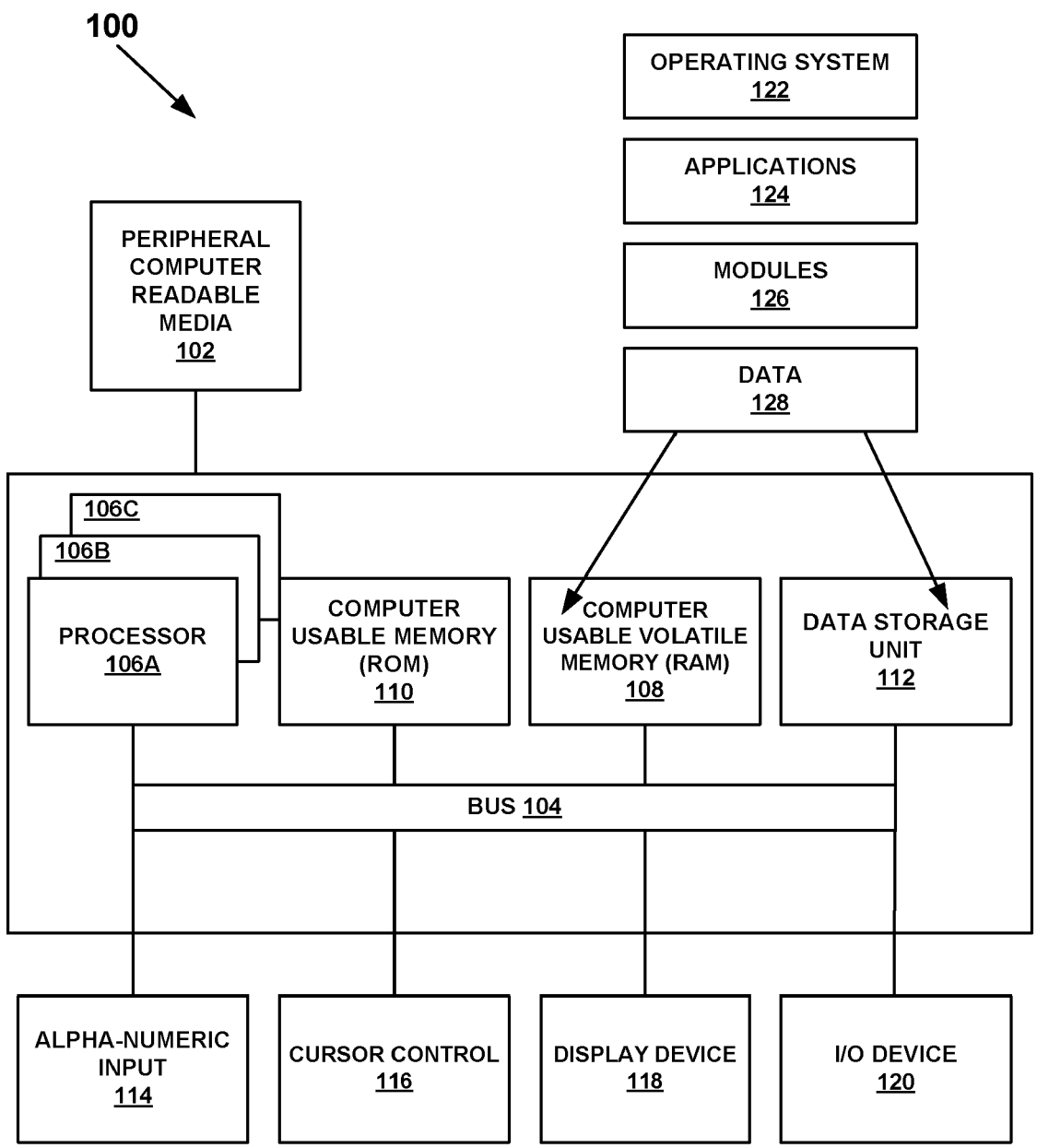
FIG. 1 is a block diagram of an example computer system used in accordance with embodiments of the present technology for classifying search query traffic.

With reference now to FIG. 1, all or portions of some embodiments of the technology for classifying search query traffic are composed of computer-readable and computer-executable instructions that reside, for example, in computer-usable media of a computer system. That is, FIG. 1 illustrates one example of a type of computer that can be used to implement embodiments, which are discussed herein, of the present technology for classifying search query traffic. FIG. 1 illustrates an example computer system 100 that can be used in accordance with embodiments of the present technology for classifying search query traffic. It is appreciated that system 100 of FIG. 1 is only an example and that embodiments of the present technology for classifying search query traffic can operate on or within a number of different computer systems including general purpose networked computer systems, embedded computer systems, routers, switches, server devices, client devices, various intermediate devices/nodes, stand alone computer systems, media centers, handheld computer systems, low-cost computer systems, high-end computer systems, and the like. As shown in FIG. 1, computer system 100 of FIG. 1 is well adapted to having peripheral computer readable media 102 such as, for example, a floppy disk, a compact disc, a DVD, flash memory, and the like coupled thereto.

System 100 of FIG. 1 can include an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 can also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 can also include an optional alphanumeric input device 114 including alphanumeric and function keys coupled to bus 104 for communicating information and command selections to processor 106A or processors 106A, 106B, and 106C. System 100 can also include an optional cursor control device 116 coupled to bus 104 for communicating user input information and command selections to processor 106A or processors 106A, 106B, and 106C. System 100 of the present embodiment can also include an optional display device 118 coupled to bus 104 for displaying information.

Referring still to FIG. 1, optional display device 118 may be a liquid crystal display, cathode ray tube, thin film transistor liquid crystal display, plasma display device or other display device suitable for creating graphic images and alphanumeric characters recognizable to a user. Optional cursor control device 116 allows the computer user to dynamically signal the movement of a visible symbol (e.g., cursor) on a display screen of display device 118 and indicate user selections of selectable items displayed on display device 118. Many implementations of cursor control device 116 are known in the art including a trackball, mouse, touch pad, joystick or special keys on alphanumeric input device 114 capable of signaling movement of a given direction or manner of displacement. Alternatively, it is pointed out that a cursor can be directed and/or activated via input from alphanumeric input device 114 using special keys and key sequence commands. System 100 is also well suited to having a cursor directed by other means such as, for example, voice commands. System 100 can also include an input/output (I/O) device 120 for coupling system 100 with external entities. For example, in one embodiment, I/O device 120 can be a modem for enabling wired and/or wireless communications between system 100 and an external network such as, but not limited to, the Internet.

Referring still to FIG. 1, various other components are depicted for system 100. In embodiments of the present technology, operating system 122 is a modular operating system that is comprised of a foundational base and optional installable features which may be installed in whole or in part, depending upon the capabilities of a particular computer system and desired operation of the computer system. Specifically, when present, all or portions of operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive (e.g., 102); and that further, operating system 122 may be accessed from a remote location via, for example, a coupling to the internet. In some embodiments, for example, all or part of the present technology for classifying search query traffic can be stored as an application 124 or module 126 in memory locations within RAM 108, media within data storage unit 112, and/or media of peripheral computer readable media 102. Likewise, in some embodiments, all or part of the present technology for classifying search query traffic may be stored at a separate location from computer 100 and accessed via, for example, a coupling to one or more networks or the internet.

Example Systems

Figure 2A:
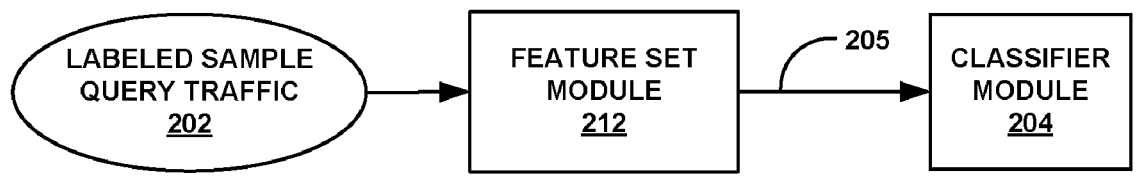
FIG. 2A is a block diagram of an example system in accordance with an embodiment of the present technology.

FIG. 2A is a block diagram of an example training system 200 in accordance with an embodiment of the present technology. For example, labeled sample query traffic or data 202 can be received by a feature set module 212. It is noted that the labeled sample query traffic 202 can include one or more samples of query traffic that are human generated search engine traffic together with one or more samples of query traffic that are automatically generated search engine traffic. Note that the labeled sample query traffic 202 can include, but is not limited to, search query keywords, search query metadata, and the like. Furthermore, the feature set module 212 can utilize the received labeled sample search query traffic 202 to create or generate one or more feature sets 205. The feature set module 212 can output the one or more feature sets 205 to a classifier module 204. The classifier module 204 can be trained utilizing the one or more feature sets 205. In addition, the classifier module 204 can be tested utilizing the one or more feature sets 205. In one embodiment, the above process of training and testing the classifier module 204 can be performed off-line. It is pointed out that once the classifier module 204 has been trained, it can be utilized to classify new incoming query search traffic (e.g., 208 of FIG. 2B) as either query traffic generated (or input) by human users or as query traffic generated by an automated process or means. As shown in FIG. 2A, the training system 200 can include, but is not limited to, labeled sample query traffic 202, the feature set module 212, the one or more feature sets 205, and the classifier module 204.

For purposes of clarity of description, functionality of each of the components in FIG. 2A is shown and described separately. However, it is pointed out that in some embodiments, inclusion of a component described herein may not be required. It is also understood that, in some embodiments, functionalities ascribed herein to separate components may be combined into fewer components or distributed among a greater number of components. It is pointed out that in various embodiments, each of the modules of FIG. 2A can be implemented with software, or firmware, or electronic hardware, or electrical hardware, or any combination thereof.

As shown in FIG. 2A, the feature set module 212 can be coupled in one embodiment to receive or retrieve labeled sample web query traffic 202. It is noted that the labeled sample query traffic 202 can include, but is not limited to, search query keywords, search query metadata, and the like. The search query keywords can include, but are not limited to, any word, any alphanumeric character, any string of alphanumeric characters, any abbreviation, and/or any acronym. Additionally, the metadata of the search query can include, but is not limited to, search query string, search query results page, search query input source, unique identifier identifying the user or device used to enter the search query, IP (internet protocol) address, query time, click time, and/or the like. Furthermore, the labeled sample web query traffic 202 can be generated in a wide variety of ways. For example in one embodiment, one or more humans can generate the labeled sample web query traffic 202 by labeling each of the sample streams of web query traffic as either generated by a human user or generated by an automated process or means. In another embodiment, one or more modules (not shown) can generate the labeled sample web query traffic 202 by labeling each of the sample streams of web query traffic as either generated by a human user or generated by an automated process. It is noted that the labeled sample web query traffic 202 can be utilized to train, validate, and possibly test the classifier module 204 as sample definitions of web query traffic generated by both human users and automated processes.

Specifically, in one embodiment, the labeled sample web query traffic 202 can be processed by the feature set module 212 such that one or more individual features are extracted to create or generate a feature set 205 (which can also be referred to as a data set or an evaluation data set). The feature set (data set) 205 contains an aggregation of the individual features extracted during the feature extraction phase performed by the feature set module 212. Moreover, the feature set module 212 can process the labeled sample web query traffic 202 to generate one or more feature sets 205. Note that the feature set module 212 can include one or more feature definitions (described herein) that define which features the feature set module 212 extracts from the labeled sample web query traffic 202 in order to generate one or more feature sets 205. Once any feature sets 205 are generated, the feature set module 212 can output them to the classifier module 204.

Within FIG. 2A, it is noted that the classifier module 204 can be trained in a wide variety of ways. For example in an embodiment, two feature sets 205 can be utilized in a training process for the classifier module 204, one feature set for training and one feature set for validation. Note that the feature set module 212 can generate both the training feature set and the validation feature set. During the training process of the classifier module 204, the training feature set can be used to propose different sets of parameters for a model that is generated by the classifier module 204. Furthermore, the validation feature set can be a small test set used during training to select the best parameters (of the different sets of parameters) for the generated model.

In one embodiment, once the classifier module 204 has been trained, a test feature set 205 can be used to evaluate the performance of the resulting classifier module 204. Specifically, the feature set module 212 can generate and output the test feature set 205 to the classifier module 204. In an embodiment, note that data in the test feature set should not be contained in either the training data set or the validation data set, otherwise the test results can be incorrect. It is pointed out that the training process (including validation) and testing of the classifier module 204 are typically done off-line or during a training mode. Once the classifier module 204 is trained, it can then be used to classify new incoming query search traffic (e.g., 208 of FIG. 2B) as either generated automatically or generated by a person.

Within FIG. 2A, the classifier module 204 can be coupled to the feature set module 212. As such, the classifier module 204 can receive one or more feature sets 205 that are output by the feature set module 212. It is noted that the feature set 205 can be implemented in a wide variety of ways. For example in an embodiment, the feature set 205 can include one or more physical features (e.g., described below) that can be utilized to train, validate, and/or test the classifier module 204 to classify web search traffic generated by human users from web search traffic generated by an automated process or means. In one embodiment, the feature set 205 can include one or more behavioral features (e.g., described below) that can be utilized to train, validate, and/or test the classifier module 204 to classify web search traffic generated by human users from web search traffic generated by an automated process or means. Furthermore, the feature set 205 can include one or more physical features and one or more behavioral features that can be utilized to train, validate, and/or test the classifier module 204 to classify web search traffic generated by human users (e.g., 224) from web search traffic generated by an automated process or means (e.g., 220). Furthermore, the feature set 205 can be used to train, validate, and/or test the classifier module 204 to also discriminate (or classify) legitimate web search traffic input by humans from illegitimate web search traffic, also input by humans. For example, humans may be paid to enter the same query over and over again. In various embodiments, illegitimate web search traffic input by humans is included as automated web search traffic. However, it should be noted that some of the features which distinguish human input behavior from automated (bot) behavior may not be useful for discriminating between legitimate and illegitimate human input web search traffic. In this case, other features that relate to keyword content can be used by the classifier module 204 to discriminate between legitimate and illegitimate human input web search traffic.

Table 1 shown below provides an overview of a set of example feature definitions that can be utilized by the feature set module 212 to define which features the feature set module 212 extracts from the labeled sample web query traffic 202 in order to generate one or more feature sets 205. It is pointed out that the feature set module 212 can utilize one or more of the feature definitions described herein to generate one or more feature sets 205. It is noted that these feature definitions of Table 1 can be classified into two groups. The first group is the result of considering a physical model of a human. The second group is a set of observed behaviors of current-day automated query traffic. Note that some of the figures include histograms that have been created based on example web query traffic for some of feature definitions, which can be then normalized to 100,000 users, but is not limited to such. It is pointed out that areas of high automated (or bot) class lift in the graphs are circled in FIGS. 3, 4, 6 and 8-14. Thus, the vertical axes of some of the figures are counts of users for the corresponding feature, and the horizontal axes are discretized ranges of that feature. In a few cases, a normalization process to one million user identifiers (IDs) was performed in order to allow the areas of interest to be sufficiently displayed in some of the figures.

TABLE 1

| Name | Description | Type |
|---|---|---|
| Number of requests, queries, clicks | Number of requests, queries, clicks | Physical |
| Query Rate | The max number of queries in any defined time period | Physical |
| Number of IPs/locations | Number of originating IPs/cities. | Physical |
| Click-Through Rate | Ratio of queries to clicks | Behavioral |
| Alphabetical Score | Indicator that the queries are in alphabetical order | Behavioral |
| Spam Score | Indicator that the keywords are associated with spam | Behavioral |
| Adult Content Score | Indicator that the keywords are pornographic in nature | Behavioral |
| Keyword Entropy | Informational entropy of query terms | Behavioral |
| Keyword Length Entropy | Informational entropy of query term lengths | Behavioral |
| Request Time Periodicity | Periodicity of requests, queries, clicks | Behavioral |
| Advanced Query Syntax Score | Number of advanced syntax terms in requests, e.g. inURL:, intitle:, site: | Behavioral |
| Category Entropy | Informational entropy of categories associated with distinct queries | Behavioral |
| Reputation | Blacklisted IPs, user agents, country codes, etc. | Behavioral |
| Query Window | Separate user stream in discrete windows, any action type in stream | Behavioral |
| Browser IDs | Number of browser IDs that are open | Behavioral |
| Query URL Click-Through Probability | Click-through rates for a query/URL pair | Behavioral |
| Program Specified Field | Indicator field of program source that identifies it | Behavioral |

As previously mentioned, the feature set 205 can include a physical model feature set, which can include one or more features which are designed to model the interaction of a user and the search engine. Humans have physical limitations for entering queries, reading the results, and clicking on URLs (Uniform Resource Locators). For example, a typical person can usually issue and absorb a few queries in any ten second period. A user with 100 distinct requests in ten seconds would lie outside the boundary of normal use. Search query traffic entered by automated means are not subject to these physical limitations. Thus, the following three feature definitions may be used to train, validate, and/or test the classifier module 204 to discriminate between web search traffic input from humans and automated bots.

Figure 2B:
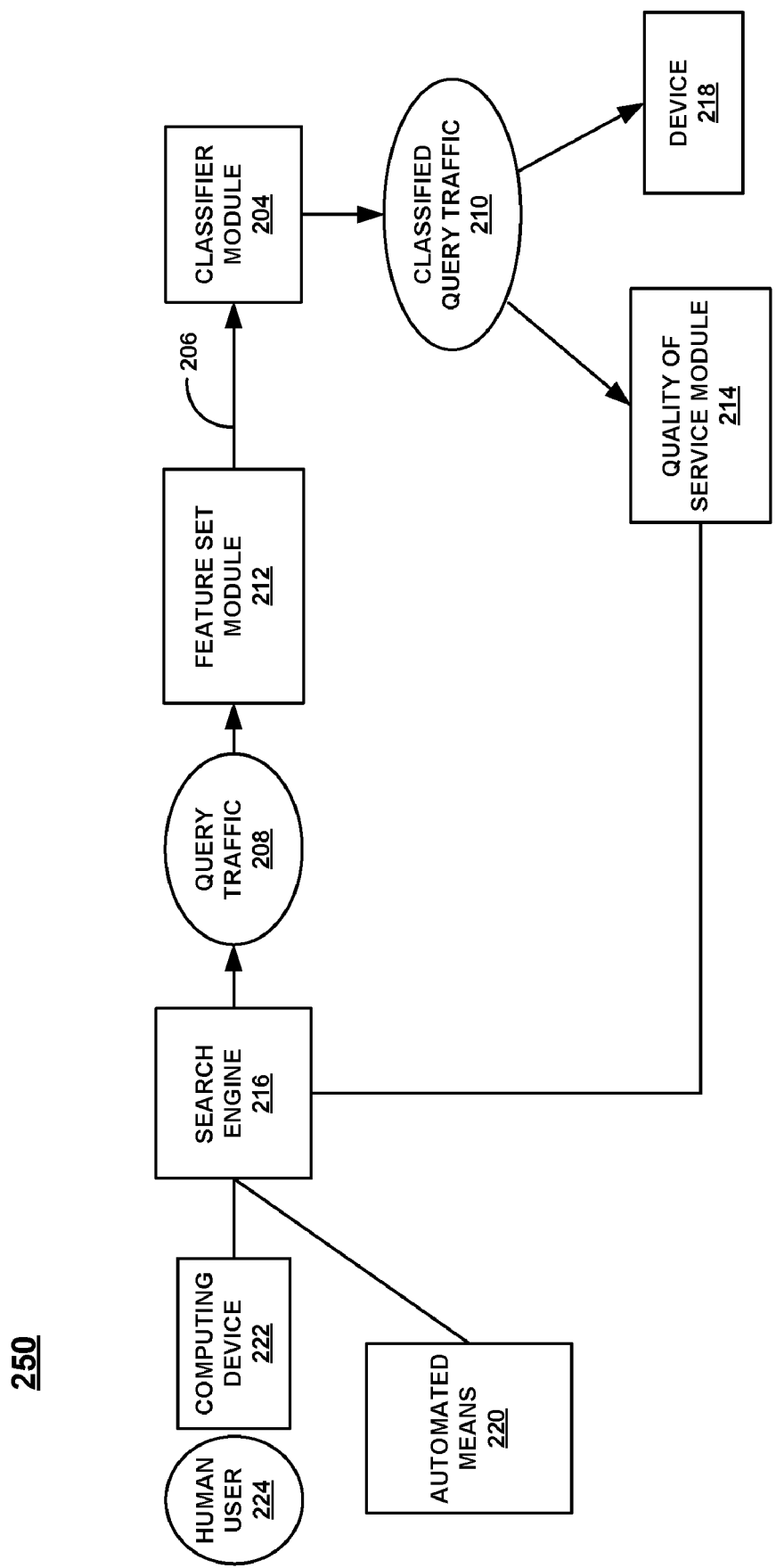
FIG. 2B is a block diagram of another example system in accordance with an embodiment of the present technology.

For example in one embodiment, one physical feature definition can be based on the number of requests, queries and/or clicks received by a search engine (e.g., 216 of FIG. 2B) from a user (e.g., 220 or 224 of FIG. 2B). Note that a strong first indicator of automated traffic is volume. Bots (e.g., 220 of FIG. 2B) often submit many more queries (and possibly clicks) in a given day than the typical person (e.g., 224 of FIG. 2B). Volume represents a class of features for which aggregate statistics can provide insight into the class or identity of a user ID.

Figure 3:
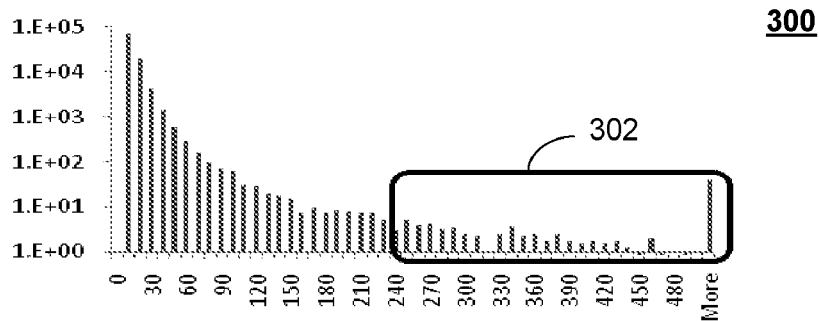
FIG. 3 is an example histogram in accordance with an embodiment of the present technology.

For example, FIG. 3 is an example histogram 300 that includes the distribution of the number of search requests from each unique user in a sample. While it is possible that a human user submits more than 200 queries in a given day, the histogram 300 suggests it occurs with an unnatural probability. Upon inspection, it is found that most of the traffic at or above this volume within the circled area 302 appeared to be automated. As an example, one user identifier (ID) queried the search engine for "mynet" 12,061 times during one day.

Figure 4:
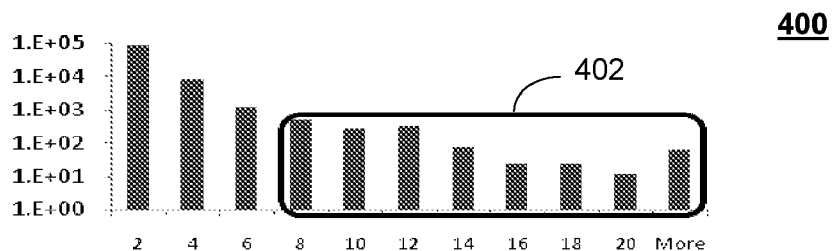
FIG. 4 is an example graph in accordance with an embodiment of the present technology.

In an embodiment, one physical feature definition can be based on the query rate. Since bots are automated, they often enter queries at a much higher rate than queries which have been entered on a keyboard by a human. Various statistics of the query rate such as the average, median, and/or maximum can be utilized to distinguish queries generated by bots versus humans. It is pointed out that humans rarely submit more than 7 requests in any 10 second interval. FIG. 4 is an example graph 400 of the distribution of the maximum queries for a user in any 10 second interval over the course of a day. The users falling into the circled area 402 were by and large bot traffic.

Another physical feature definition can be based on the number of Internet Protocol (IP) addresses and/or locations utilized by a user ID. Note that a human cannot be in two distant places at the same time. In one embodiment, a list can be maintained of requester IP addresses used by each user ID. The motivation is to discover potential bot nets. If a user's cookie is compromised by miscreants and is used to make queries from two or more IP addresses, possibly located across large geographical distances, or is used in an interleaved fashion from two IP locations again separated by significant distances, then the unique ID likely belongs to two or more computers each of which are owned by a bot net. A second usage scenario is when a user ID is querying the system through an anonymous browsing tool, but has not disabled cookies.

Figure 5:
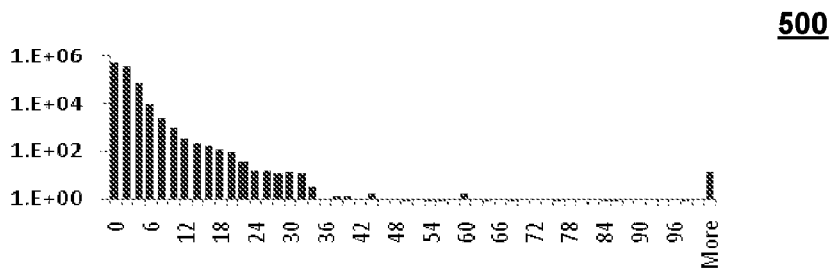
FIG. 5 is another example histogram in accordance with an embodiment of the present technology.
Figure 6:
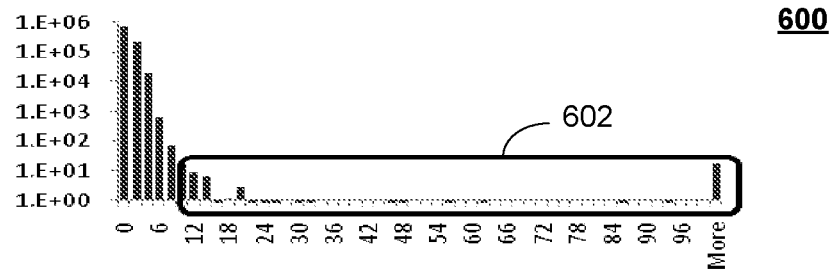
FIG. 6 is yet another example histogram in accordance with an embodiment of the present technology.

When correlating IP addresses, it can be desirable to allow for mobile computers and devices which are used in the morning in one city, but later in the day at one or more additional cities. Also, users accessing the internet via a dial-up modem are often assigned a new IP address by the internet service provider (ISP) each time the user logs into the internet service. As a result, it is desirable that the feature ignore small variances in geographic location. FIG. 5 is an example histogram 500 of the number of users employing multiple IP addresses, which includes all four octets, (normalized to one million users). Note that example histogram 600 of FIG. 6 depicts the same users of histogram 500 wherein only the first two octets of an IP address are considered. This allows for multiple IP addresses in the same geographical region. Within histogram 600 of FIG. 6, region 602 is where significant lift is found in bot classification. Note that a bot (e.g., 220) from the same cookie but from many cities would be flagged by this feature.

The previous three physical feature definitions can be utilized to discriminate traffic generated by humans from that produced by automated means. However, automated search query traffic can be modeled to mimic human input. For this reason, one or more of the following behavioral feature definitions can be utilized by the classifier module 204 to classify "legitimate" web search traffic generated by typical users from "illegitimate" traffic generated by automated means.

In one embodiment, one behavioral feature definition can be based on the click-through rate of a search engine user. Much of automated traffic is likely used for information gathering purposes, either to examine the search engine's index, or to collect data for self-use, and thus exhibits lower than typical click-through rates. It is pointed out that click-through rates for humans can vary, but typically users click at least once in ten queries. Additionally, it is suggested that many of the zero-click users are automated. Further, in one embodiment, when used in conjunction with the total number of queries issued over a day, this feature provides a very good lift or indication of automated users.

Figure 7A:
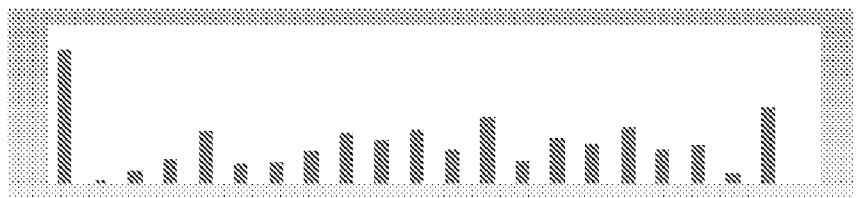
FIG. 7A is yet another example graph in accordance with an embodiment of the present technology.
Figure 7B:
FIG. 7B is still another example graph in accordance with an embodiment of the present technology.
Figure 8:
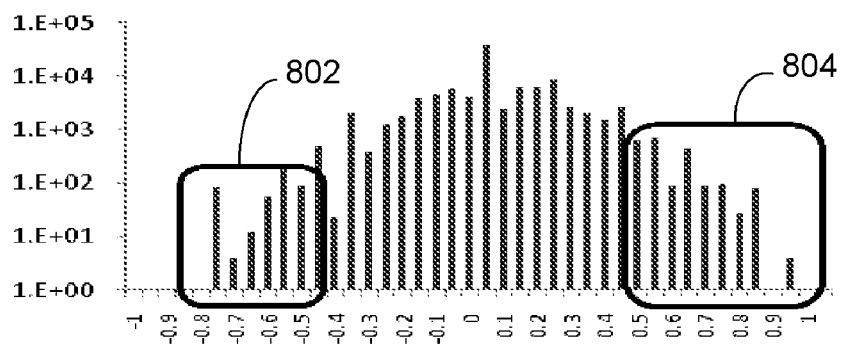
FIG. 8 is another example graph in accordance with an embodiment of the present technology.

FIGS. 7A and 7B include two distributions that illustrate this principle. Specifically, FIG. 7A includes an example graph 700 that plots click-through rates for all users in a sample with at least a modest number of queries. The data was further pruned to those users with ten times as many queries, shown in example graph 750 of FIG. 7B (neither are log plots). Clearly, as the number of queries increases, the percentage of zero-click users increases as shown in graph 750. This is counter-intuitive if the study was limited to human users, since each query has a non-zero probability for clicking. However, if automated traffic is considered, the reason for this increase may be that most bots do not need to click on the results of their queries.

Even in the case where the bot requires extended information about the URL target, the bot can be programmed to load this URL directly. Thus there are three typical bot click through rates; a bot that clicks on no links, a bot that clicks on every link, and a bot that only clicks on targeted links. Of these, the first is the most common by a wide margin.

For example, one user ID queried for 56,281 times without a single click. On the other extreme, a second user ID made 1,162 requests and clicked each time. Upon inspection of the queries, it appeared the user ID was downloading the html for each impression in the index for the keywords "168.216.com.tw." Also, it is noted that the user ID previously mentioned above that clicked on 1,874 out of 1,892 requests would also be discovered by this behavioral feature when utilized by the classifier module 204.

In an embodiment, one behavioral feature definition can be based on an alphabetical ordering of queries. It is pointed out that a number of instances of bot-generated queries have been identified which have significant alphabetical ordering. It may be that the authors of the programs use the alphabetical ordering for improved searching or analyzing. When submitted to the search engine, it is quite detectable. In one embodiment, to calculate an alphabetical score for a user, the queries are ordered chronologically and for each query pair <i, i+1>, 1 is added if i+1 sorts after i, and subtract 1 if i+1 sorts before i. This number is then normalized by the total number of queries. In the majority of cases, the alphabetical score is near zero, as shown in example graph 800 of FIG. 8. The discretization [−0.05, +0.05] contains more than 50% of the mass in the distribution. In an embodiment, in almost all cases where the user ID has more than a couple queries and the alphabet score was outside [−0.30, +0.30] as indicated by regions 802 and 804, it is believed that traffic is automated (e.g., 220).

Figure 9:
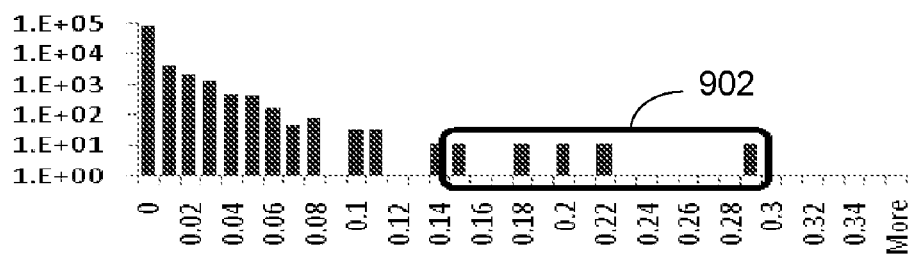
FIG. 9 is still another example histogram in accordance with an embodiment of the present technology.
Figure 10:
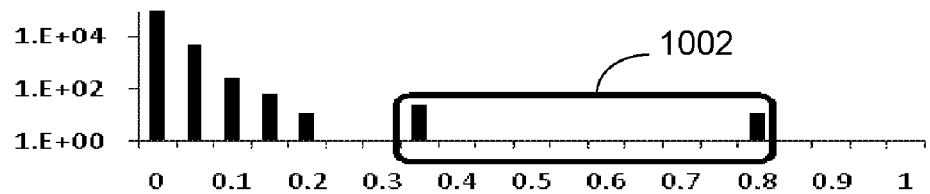
FIG. 10 is another example histogram in accordance with an embodiment of the present technology.

In one embodiment, one behavioral feature definition can be based on a spam score. Spam bots can submit spam words to a search engine such as, but not limited to, the following queries: "managing your internal communities", "mailing list archives", "student loan bill", "your dream major", "computer degrees from home", "free shipping coupon offers", "based group captive convert video from", "book your mountain resort", "agreement forms online", "find your true love", "products from thousands", and "mtge market share slips". Consequently, a feature which estimates the amount of spam words in the search queries can be useful for detecting queries from spam bots. In an embodiment, a spam score can be computed as a feature using a bag of <spam word, weight> pairs for all queries for each user ID. The weight assigns a probability that a given keyword is spam. For example, the term "Viagra" has a higher probability of being spam than the term "coffee." FIG. 9 is an example normalized histogram 900 of the spam score for queries received from individual cookies. The circled region 902 in the histogram 900 indicates user IDs submitting queries containing large numbers of spam terms. In an embodiment, per user scores are generated by summing the keyword spam score for their queries.

In an embodiment, one behavioral feature definition can be based on an adult content score. The adult entertainment industry has taken to the web with vigor. Many in this industry attempt to attract new customers by directing users to web sites containing pornography. Adult content enterprises may employ bots to measure the ranking of their website or try to boost their website's rank in the search engine. Although it is also a common human query space, there is lift or increase in relative adult query counts. Thus, bot generated queries often contain words associated with adult content. As with the spam score, another bag of <adult word, weight> pairs can be used to compute an adult score for each user ID. An example normalized histogram 1000 is presented in FIG. 10 where circled region 1002 indicates significant lift for bot detection.

Figure 11:
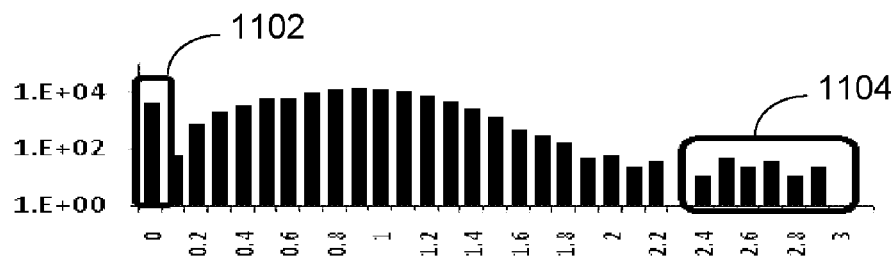
FIG. 11 is yet another example graph in accordance with an embodiment of the present technology.
Figure 12:
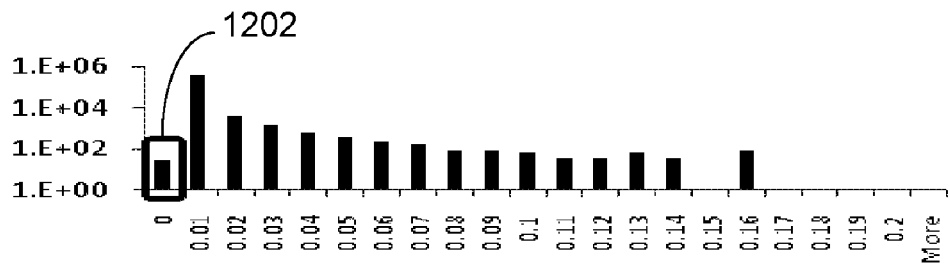
FIG. 12 is still another example graph in accordance with an embodiment of the present technology.
Figure 13:
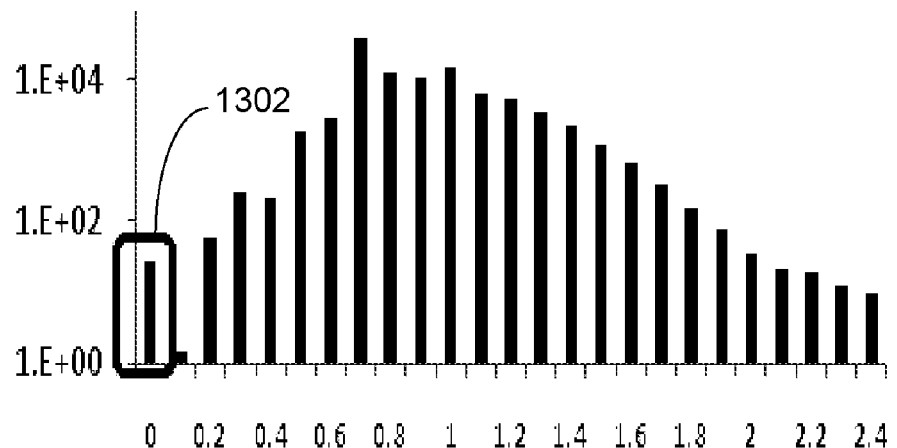
FIG. 13 is another example graph in accordance with an embodiment of the present technology.

In an embodiment, one behavioral feature definition can be based on query keyword entropy. Many bots enter queries that are extremely redundant; as a result, bot queries tend to have keyword entropies which fall outside normal usage patterns. A map can be calculated of <word, count> pairs for each user ID. Then traditional informational entropy, H(k), is use to assign a score to each user:

$$H(k) = E(J(k)) == \sum_i \sum_j [p(k_{ij}) \log(p(k_{ij}))]$$

where $k_{ij}$ is the jth keyword (e.g., query term) in the ith query submitted by a single user ID. It is noted that log base e (2.71828) is used in the above H(k) formula. However, in one embodiment, the above H(k) formula can use other log bases including log base 2 or log base 10 instead of using log base e. FIG. 11 is an example graph 1100 that plots the distribution of the entropy of keywords in the set of queries issued by users. In one example of a low keyword entropy bot, a user queried "mynet" 10,497 times, generating an entropy of zero as indicated by circled region 1102. It is pointed out that circled region 1104 indicates those bots that exhibit very high query keyword entropy that are outside normal human usage patterns. Note that in one embodiment, one could also consider utilizing the entropy of each query, without parsing it into keywords.

In one embodiment, one behavioral feature definition can be based on query word length entropy. Typical query terms have a natural word length entropy distribution, as does the length of a typical query. Some bots query for specific classes of words which are outliers of this distribution. For example, the word length entropy for a "stock quote" bot that queries using almost all single keywords will have a lower word length entropy compared to that for a typical human. The word length entropy WLE is calculated as:

$$WLE(l_{ij}) = -\sum_i \sum_j l_{ij} \log(l_{ij})$$

where i is the index for each separate query submitted to the search engine by a single user ID and $I_{ij}$ the length of the individual query term j in the ith query. Note that log base e is used in the above WLE formula. However, in one embodiment, the above WLE formula can use other log bases including log base 2 or log base 10 instead of using log base e. It is pointed out that in one embodiment, both the H(k) formula and the WLE formula are determined using log base 2. In another embodiment, both the H(k) formula and the WLE formula are determined using log base e. The word length entropy is shown in an example graph 1200 of FIG. 12 (which is normalized to one million users). Note that circle region 1202 can indicate a word length entropy of a "stock quote" bot. In an embodiment, one could also have as a behavioral feature the longest query in the session.

In one embodiment, one behavioral feature definition can be based on query time periodicity. It is not uncommon for a bot to generate traffic at regular time intervals. To capture this property, requests can be sorted by request time for each user, and calculate the difference in time between successive entries. For each observed delta, the number of occurrences for each user is recorded. The informational entropy can then be calculated of the deltas (a second option would be to calculate an FFT score for each user). This can be done at a variety of granularities for time deltas (e.g., seconds, 10 seconds, minutes, etc.). The distribution for seconds can be seen in an example graph 1300 of FIG. 13. In an embodiment, this feature can be used to investigate dwell time, which is the time between when a search is requested and when something corresponding to that search is selected. When combined with other features, such as the number of requests, it has the potential to provide significant lift to bot search traffic. For example, a user ID with 30 queries may not appear automated based on request count alone, but if the entropy for time deltas is zero (as indicated by circled region 1302 of FIG. 13), it is much more likely to be a bot.

Figure 14:
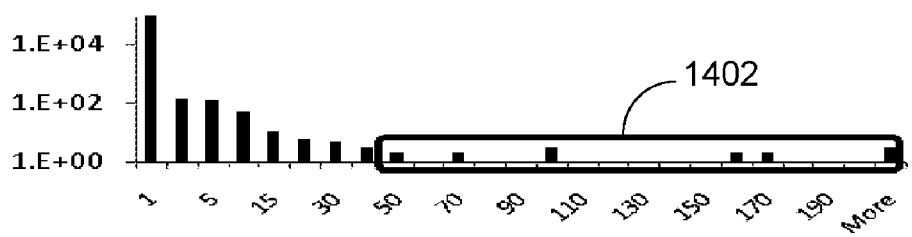
FIG. 14 is yet another example histogram in accordance with an embodiment of the present technology.

In an embodiment, one behavioral feature definition can be based on advanced query syntax. It is pointed out that some bots use advanced syntax to probe particular features of the index of a search engine. For example, prefixing a query with "intitle:" for many search engines can force results to have the listed keywords as part of the title of the web page. Similarly, prefixing a query with "inURL:" will restrict results to those URLs which have the keywords embedded into the URL. To discover bots which use advanced query syntax, a total count is kept of all advanced terms for each user throughout a day (or any other time period). An example histogram 1400 is shown in FIG. 14. In one sample of queries, less than $\frac{1}{10}^{th}$ of one percent of users use more than 5 advanced terms in the sample. As an example of a bot, one user had 110 queries, all of which requested the terms appear in the title of the web page. It is noted that circled region 1402 of FIG. 14 indicates an example of high count of advanced query syntaxes, which represent automated or bot traffic.

In one embodiment, one behavioral feature definition can be based on category entropy. As a generalization of both adult content score and spam score, a feature can be defined which captures the number of distinct categories associated with a user ID. A category hierarchy can be used to assign a category to each query. Then the category entropy can be tracked for each user ID.

In an embodiment, one behavioral feature definition can be based on reputations and trends. There are several fields in the query logs that can directly identify known bot activity. Examples include blacklisted IP addresses, blacklisted user agents, and particular country codes. Tables are built for each property using domain expertise. For these cases, in one embodiment, a lookup is performed into these tables at runtime. In less direct cases, query and query-click probability lists are used. For example, some bots search rare queries inordinately often. Note that some bots can have sessions where each query is nonsensical. To detect these bots in one embodiment, a table of query-frequency pairs can be used to evaluate the popularity of the session's queries. Finally, a table of query-URL click pairs can be stored to evaluate the probability that the user will click on a particular page. Users who often click on very low probability pairs are then deemed suspect. In one embodiment, a potential weakness of these last two features is that a separate process may be used to update the tables on a regular basis, and the tables can be somewhat large.

In one embodiment, one behavioral feature definition can be based on query windows. A user stream can be separated into discrete windows (e.g., by a 30 minute quiescence period or any quiescence period) that designate distinct user sessions. This can be done for any action type in a user's stream. For example in an embodiment, it can be used for queries as follows: total number of query windows; average number of queries in the windows; standard deviation of the number of queries in the windows; average length of time for the query windows; and/or standard deviation of the length of time for the query windows. In one embodiment, it can be used it for clicks as follows: total number of click windows; average number of clicks in the windows; standard deviation of the number of clicks in the windows; average length of time for the click windows; and/or standard deviation of the length of time for the click windows.

In one embodiment, one behavioral feature definition can be based on browser IDs. Specifically, a determination is made as to the number of browser IDs that are open or are being opened up in association with each user ID. It is noted that an automated means can have multiple browser IDs open or being opened in association with the search engine.

In an embodiment, another behavioral feature definition can be based on query URL click-through probability. Specifically, to compensate for click fraud, a determination can be made of a query URL click-through rate. If there is a particular user that artificially boosts that click through rate up more than a predefined percent, then it is known that it is unnatural for this user to click that many times to promote the rankings.

In one embodiment, one behavioral feature definition can be based on a program specified field. Specifically, a program source that interacts with the web search engine can also include an indicator field. The indicator field can be program specified and can identify or help identify the program source as automated means or human user.

Within FIG. 2A, the feature set module 212 can be coupled to receive or retrieve labeled sample query traffic 202. Furthermore, the classifier module 204 can be coupled to receive or retrieve one or more feature sets 205 from the feature set module 212.

The classifier module 204 can be implemented in a wide variety of ways. For example, the classifier module 204 can be implemented using, but is not limited to, the Bayes Net Classifier, Naïve Bayes Classifier, Logistic Regression, AdaBoost (Adaptive Boosting), Bagging (Bootstrap aggregating), ADTree (Alternating Decision Tree), PART Classifier, ID3 (Iterative Dichotomiser 3) algorithm, M1 Classifier, and/or the like.

FIG. 2B is a block diagram of an example system 250 for classifying search query traffic in accordance an embodiment of the present technology. For example in one embodiment, during a normal operating mode (as opposed to a training mode), the feature set module 212 can receive web search query traffic 208 from a search engine 216. The feature set module 212 can utilize the received search query traffic to create one or more feature set 206. The feature set module 212 can output one or more feature sets 206 to classifier module 204. The classifier module 204 can utilize the received feature set(s) 206 with a model that was generated during a training process to classify the received web search query traffic 208 as either query traffic generated (or input) by a human 224 or as query traffic generated by an automated process or means 220. The classifier module 204 can output the classified web query traffic 210 to a quality of service module 214 and/or another device 218. If the quality of service module 214 receives the classified web query traffic 210, based on the class of the classified web query traffic 210, the quality of service module 214 can modify or change the quality of service that is provided by the search engine 216 to a user (e.g., 224). As shown in FIG. 2B, the system 250 can include, but is not limited to, the classifier module 204, the feature set module 212, the feature set 206, the search engine 216, the web query traffic 208, the classified query traffic 210, the quality of service module 214, a computing device 222, the human user 224, the automated means or process 220, and the device 218.

For purposes of clarity of description, functionality of each of the components in FIG. 2B is shown and described separately. However, it is pointed out that in some embodiments, inclusion of a component described herein may not be required. It is also understood that, in some embodiments, functionalities ascribed herein to separate components may be combined into fewer components or distributed among a greater number of components. It is pointed out that in various embodiments, each of the modules of FIG. 2B can be implemented with software, or firmware, or electronic hardware, or electrical hardware, or any combination thereof.

As shown in FIG. 2B, in one embodiment, the feature set module 212 can be coupled to the search engine 216 in order to receive or retrieve web search query traffic 208. Note that the web search query traffic 208 can be stored in data logs associated with one or more search engines 216. In one embodiment, the classification process of the web search query traffic 208 by system 250 can be done in real-time and the results 210 can be used in real-time or stored as additional data in web search logs. It is noted that the web search query traffic 208 can include, but is not limited to, search query keywords, search query metadata, and the like. The search query keywords can include, but are not limited to, any word, any alphanumeric character, any string of alphanumeric characters, any abbreviation, and/or any acronym. Additionally, the metadata of the search query can include, but is not limited to, search query string, search query results page, search query input source, unique identifier identifying the user or device used to enter the search query, IP (internet protocol) address, query time, click time, and/or the like. Moreover, the web query search traffic 208 can be generated in a wide variety of ways. For example, the web query search traffic 208 could be generated by, but is not limited to, one or more persons (e.g., 224) using computing devices (e.g., 222) to enter search queries into one or more search engines (e.g., 216), one or more automated means (e.g., 220) entering search queries into one or more search engines (e.g., 216), one or more persons (e.g., 224) using computing devices (e.g., 222) to interact with one or more search engines (e.g., 216), one or more automated means (e.g., 220) interacting with one or more search engines (e.g., 216), and/or the like. It is pointed out that computing device 222 can be implemented as, but is not limited to, a computer system, a mobile phone, a computer, a laptop computer, a personal computer (PC), a mainframe computer, a desktop computer, a handheld computing device, a server, a distributed computer system, and the like.

It is noted that once the web query search traffic 208 is received, the feature set module 212 can operate in a manner similar to that described herein with reference to training system 200. Specifically, in one embodiment during normal mode (as opposed to training mode), the query search traffic 208 can be processed by the feature set module 212 such that one or more individual features are extracted to create or generate a feature set 206 (which can also be referred to as a data set or an evaluation data set). The feature set (data set) 206 can contain an aggregation of the individual features extracted during the feature extraction phase performed by the feature set module 212. Note that the feature set module 212 can process the query search traffic 208 to generate one or more feature sets 206. It is pointed out that the feature set module 212 can include one or more feature definitions (e.g., as described herein) that define which features the feature set module 212 extracts from the query search traffic 208 in order to generate feature set 206. Once any feature sets 206 are generated, the feature set module 212 can output them to the classifier module 204.

Within FIG. 2B, the classifier module 204 can utilize the received feature set 206 with a model that was generated during its training process (e.g., FIG. 2A) to classify the received search query traffic as either query traffic generated (or input) by a human 224 or as query traffic generated by an automated process or means 220. The classifier module 204 can output the identified or classified web query traffic 210. It is noted that in one embodiment, the classifier module 204 can output the identified web query traffic 210 to a quality of service module 214 and/or a device 218 (e.g., a modem, memory, and the like), but is not limited to such. Based on the identity of the identified web query traffic 210, the quality of service module 214 can modify or adjust the quality of service that is provided by the search engine 216 to the user (e.g., 220 and 224). For example in an embodiment, if the identified web query traffic 210 was determined to be generated by automated means or process 220, the quality of service module 214 can cause the search engine 216 to delay servicing that query in order to service any search queries generated by human users 224. In one embodiment, if the identified web query traffic 210 was determined to be generated by automated means or process 220, the quality of service module 214 can cause the search engine 216 to not include advertisements with the search results that will be output to the automated means or process 220.

Within system 250, the feature set module 212 can be coupled to the search engine 216 in order to receive or retrieve the web query traffic 208. Furthermore, the classifier module 204 can be coupled to receive or retrieve any feature sets 206 from the feature set module 212. The classifier module 204 can be coupled to output the classified web query traffic 210 to the quality of service module 214 and/or the device 218. The quality of service module 214 can be coupled to communicate with (or control) the search engine 216. One or more automated processes or bots (e.g., 220) can be coupled to communicate (e.g., via the internet or some type of communication network) with the search engine 216. The search engine 216 can be coupled to one or more computing devices (e.g., 222), e.g., via the internet or some type of communication network, which can be utilize by one or more human users (e.g., 224) to communicate with the search engine 216.

As previously noted, the classifier module 204 can be implemented in a variety of ways. For example, the classifier module 204 can be implemented using, but is not limited to, the Bayes Net Classifier, Naïve Bayes Classifier, Logistic Regression, AdaBoost (Adaptive Boosting), Bagging (Bootstrap aggregating), ADTree (Alternating Decision Tree), PART Classifier, ID3 (Iterative Dichotomiser 3) algorithm, M1 Classifier, and/or the like.

The following discussion relates to an implementation in accordance with one embodiment along with preliminary results towards using a proposed feature set for classifying search traffic. In this implementation, 320 different user sessions were labeled, of which 189 were normal user sessions and 131 were automated sessions. Data can be labeled by randomly sampling web search query traffic samples. Alternatively, an active learning sampling approach can be used to select samples to label which may lead to training more accurate classifiers (e.g., 204) with less labeled data. This distribution is artificially skewed towards an equal distribution because an active learner was employed to choose which sessions to label. It is noted that a larger set of labeled sessions would improve confidence.

Reported below are classification results provided by the publicly available Weka toolset, as shown in Table 2. In all cases, 10-fold cross validation was used. It is noted that automated traffic labeled as automated traffic is considered to be a true positive, noted as TP. Most of the classifiers chosen afforded greater than 90% accuracy on this small labeled set.

TABLE 2

Classification results using proposed feature set (320 labeled data points).

| Classifier | TP | TN | FP | FN | % |
|---|---|---|---|---|---|
| Bayes Net | 183 | 120 | 11 | 6 | 95 |
| Naïve Bayes | 185 | 106 | 25 | 4 | 91 |
| AdaBoost | 179 | 119 | 10 | 12 | 93 |
| Bagging | 185 | 115 | 16 | 4 | 94 |
| ADTree | 182 | 121 | 10 | 7 | 95 |
| PART | 184 | 120 | 11 | 5 | 95 |

Weka's attribute evaluator was also used to gain insight into the relative benefits of each feature, namely Information Gain using the Ranker search method. The top five features in order were query count, query entropy, max requests per 10 seconds, click through rate, and spam score, with ranks of 0.70, 0.39, 0.36, 0.32, and 0.29. As suspected, volume is a key indicator of present-day automated activity.

Example Methods of Operation

Figure 15:
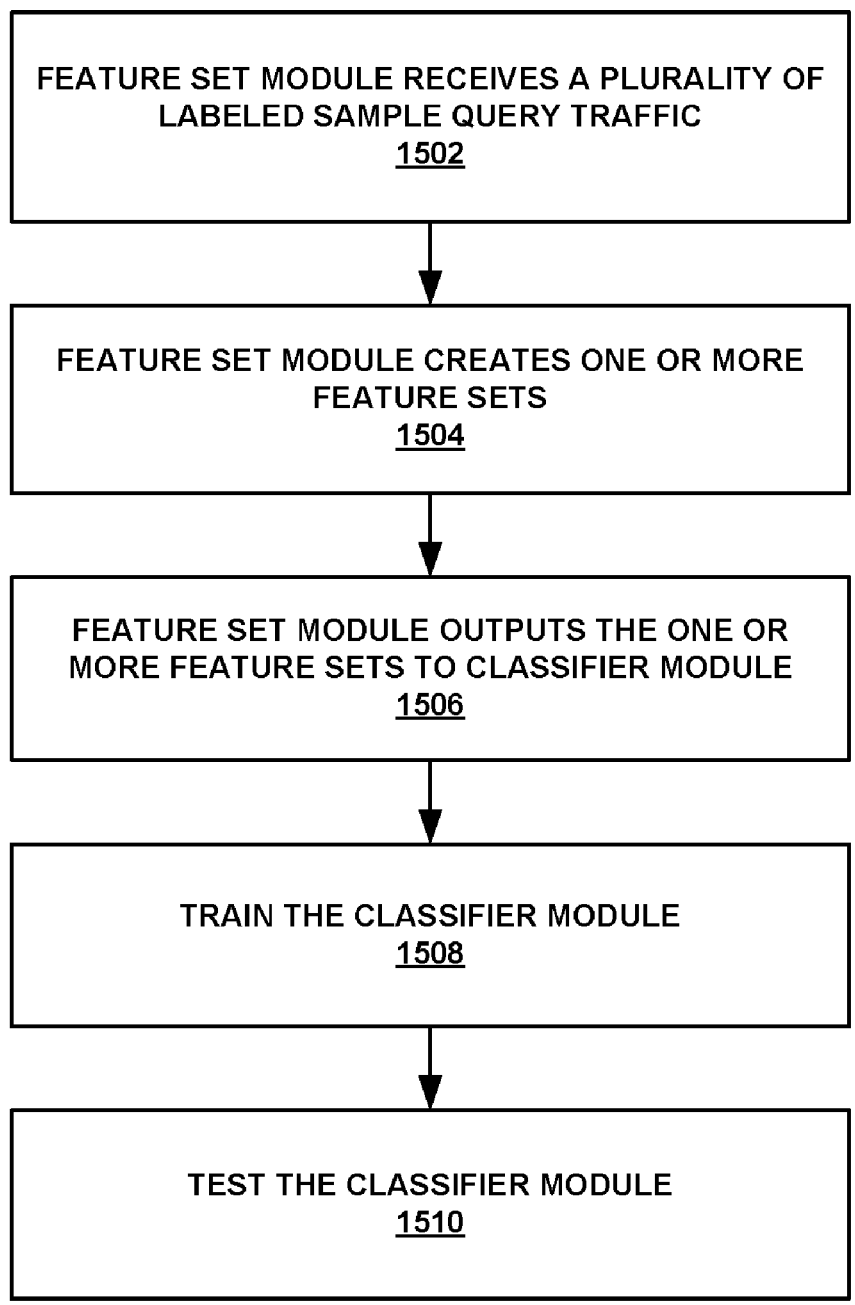
FIG. 15 is an example flow diagram of operations performed in accordance with various embodiments of the present technology.

The following discussion sets forth in detail the operation of some example methods of operation of embodiments of the present technology for classifying search query traffic. FIG. 15 is a flow diagram of an example method 1500 for training a classifier module in accordance with various embodiments of the present technology. Flow diagram 1500 includes processes that, in various embodiments, are carried out by a processor(s) under the control of computer-readable and computer-executable instructions (or code), e.g., software. The computer-readable and computer-executable instructions (or code) may reside, for example, in data storage features such as computer usable volatile memory 108, computer usable non-volatile memory 110, peripheral computer-readable media 102, and/or data storage unit 112 of FIG. 1. The computer-readable and computer-executable instructions (or code), which may reside on computer useable media, are used to control or operate in conjunction with, for example, processor 106A and/or processors 106A, 106B, and 106C of FIG. 1. However, the computing device readable and executable instructions (or code) may reside in any type of computing device readable medium. Although specific operations are disclosed in flow diagram 1500, such operations are examples. Method 1500 may not include all of the operations illustrated by FIG. 15. Also, embodiments are well suited to performing various other operations or variations of the operations recited in flow diagram 1500. Likewise, the sequence of the operations of flow diagrams 1500 can be modified. It is appreciated that not all of the operations in flow diagram 1500 may be performed. It is noted that the operations of method 1500 can be performed by software, by firmware, by electronic hardware, by electrical hardware, or by any combination thereof.

It is noted that process 1500 can include a feature set module that can receive a plurality of labeled sample search query traffic or data. Additionally, the feature set module can utilize the received labeled sample search query traffic to create one or more feature sets. The feature set module can output the one or more feature sets to a classifier module. The classifier module can be trained utilizing the one or more feature sets. The classifier module can be tested utilizing the one or more feature sets.

At operation 1502 of FIG. 15, a feature set module (e.g., 212) can receive or retrieve a plurality of labeled sample search query traffic or data (e.g., 202). It is noted that operation 1502 can be implemented in a wide variety of ways. For example, operation 1502 can be implemented in any manner similar to that described herein, but is not limited to such.

At operation 1504, the feature set module can utilize the received labeled sample search query traffic to create or generate one or more feature sets (e.g., 205), which can also be referred to as data sets. It is pointed out that operation 1504 can be implemented in a wide variety of ways. For example, the one or more feature sets of operation 1504 can include, but are not limited to, a training data set, a validation data set, and/or a test data set. Operation 1504 can be implemented in any manner similar to that described herein, but is not limited to such.

At operation 1506 of FIG. 15, the feature set module can output the one or more feature sets to a classifier module (e.g., 204). Note that operation 1506 can be implemented in a wide variety of ways. For example, operation 1506 can be implemented in any manner similar to that described herein, but is not limited to such.

At operation 1508, the classifier module can be trained utilizing the received one or more feature sets. It is noted that operation 1508 can be implemented in a wide variety of ways. For example, operation 1508 can be implemented in any manner similar to that described herein, but is not limited to such.

At operation 1510 of FIG. 15, the classifier module can be tested utilizing the one or more feature sets. It is pointed out that operation 1510 can be implemented in a wide variety of ways. For example, operation 1510 can be implemented in any manner similar to that described herein, but is not limited to such. At the completion of operation 1510, process 1500 can be exited. In this manner, the classifier module can be trained in accordance with various embodiments of the present technology.

Figure 16:
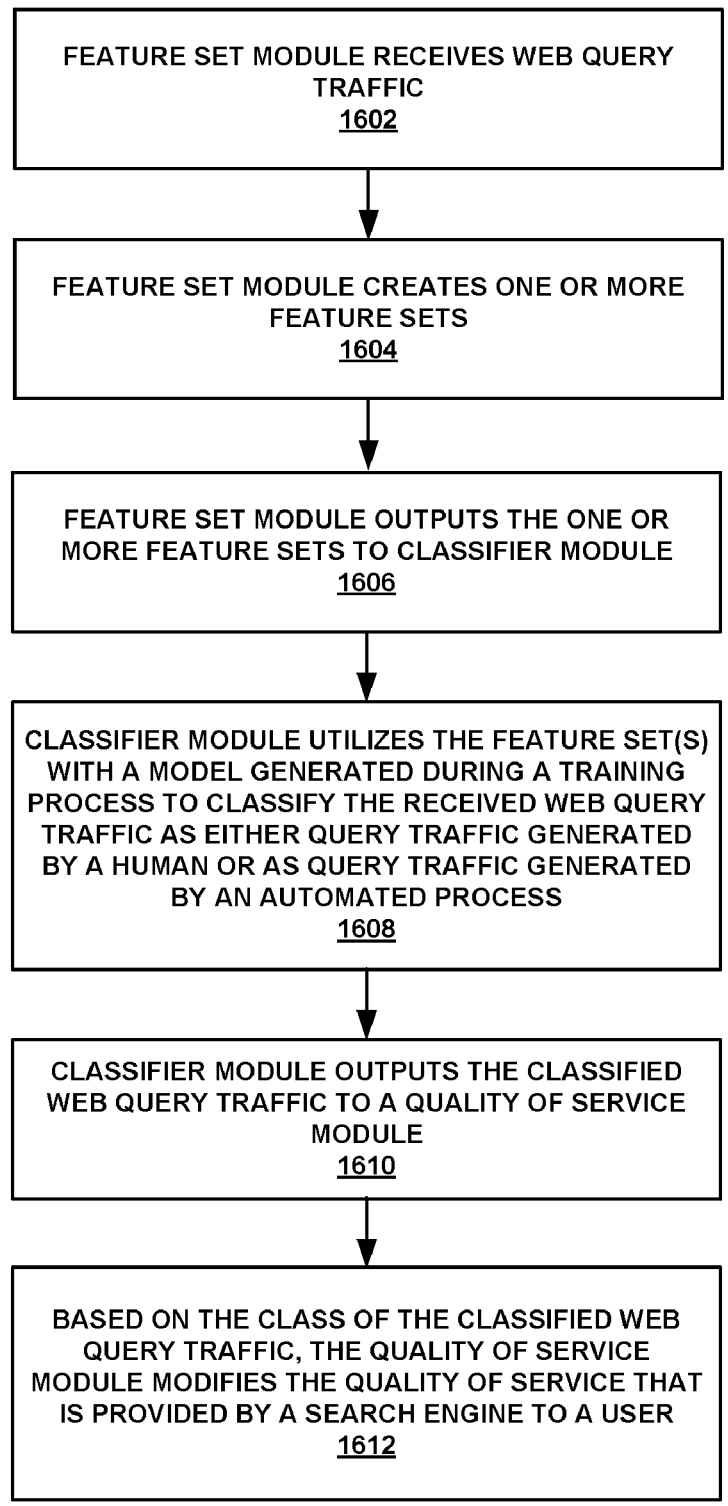
FIG. 16 is another example flow diagram of operations performed in accordance with various embodiments of the present technology.

FIG. 16 is a flow diagram of an example method 1600 for classifying search query traffic in accordance with various embodiments of the present technology. Flow diagram 1600 includes processes that, in various embodiments, are carried out by a processor(s) under the control of computer-readable and computer-executable instructions (or code), e.g., software. The computer-readable and computer-executable instructions (or code) may reside, for example, in data storage features such as computer usable volatile memory 108, computer usable non-volatile memory 110, peripheral computer-readable media 102, and/or data storage unit 112 of FIG. 1. The computer-readable and computer-executable instructions (or code), which may reside on computer useable media, are used to control or operate in conjunction with, for example, processor 106A and/or processors 106A, 106B, and 106C of FIG. 1. However, the computing device readable and executable instructions (or code) may reside in any type of computing device readable medium. Although specific operations are disclosed in flow diagram 1600, such operations are examples. Method 1600 may not include all of the operations illustrated by FIG. 16. Also, embodiments are well suited to performing various other operations or variations of the operations recited in flow diagram 1600. Likewise, the sequence of the operations of flow diagrams 1600 can be modified. It is appreciated that not all of the operations in flow diagram 1600 may be performed. It is noted that the operations of method 1600 can be performed by software, by firmware, by electronic hardware, by electrical hardware, or by any combination thereof.

It is noted that process 1600 can include a feature set module that can receive web search query traffic. The feature set module can utilize the received search query traffic to create one or more feature sets. The feature set module can output the feature set(s) to a classifier module. The classifier module can utilize the received feature set(s) with a model that was generated during a training process (e.g., method 1500) to classify the received web search query traffic as either query traffic generated by a human or as query traffic generated by an automated process. The classifier module can output the classified web query traffic to a quality of service module. Based on the class of the classified web query traffic, the quality of service module can modify or change the quality of service that is provided by a search engine to a user.

At operation 1602 of FIG. 16, a feature set module (e.g., 212) can receive or retrieve search query traffic or data (e.g., 208). It is noted that operation 1602 can be implemented in a wide variety of ways. For example, operation 1602 can be implemented in any manner similar to that described herein, but is not limited to such.

At operation 1604, the feature set module can utilize the received search query traffic to create one or more feature sets (e.g., 206). It is pointed out that operation 1604 can be implemented in a wide variety of ways. For example, operation 1604 can be implemented in any manner similar to that described herein, but is not limited to such.

At operation 1606 of FIG. 16, the feature set module can output the one or more feature sets to a classifier module (e.g., 204). Note that operation 1606 can be implemented in a wide variety of ways. For example, operation 1606 can be implemented in any manner similar to that described herein, but is not limited to such.

At operation 1608 of FIG. 16, the classifier module can utilize the received feature set(s) with a model that was generated during a training process (e.g., method 1500) to classify the received search query traffic as either query traffic generated by a human (e.g., 224) or as query traffic generated by an automated process or means (e.g., 220). It is pointed out that operation 1608 can be implemented in a wide variety of ways. For example, operation 1608 can be implemented in any manner similar to that described herein, but is not limited to such.

At operation 1612, the classifier module can output the classified or identified search query traffic (e.g., 210) to a quality of service module (e.g., 214). Note that operation 1612 can be implemented in a wide variety of ways. For example, operation 1612 can be implemented in any manner similar to that described herein, but is not limited to such.

At operation 1614 of FIG. 16, based on the class or identity of the classified search query traffic, the quality of service module can modify or change the quality of service that is provided by a search engine (e.g., 216) to a user (e.g., 220 or 224). It is pointed out that operation 1614 can be implemented in a wide variety of ways. For example, operation 1614 can be implemented in any manner similar to that described herein, but is not limited to such. At the completion of operation 1614, process 1600 can be exited. In this manner, search query traffic can be classified in accordance with various embodiments of the present technology.

Example embodiments of the present technology are thus described. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for classifying search query traffic, said method comprising:

receiving, from a search engine, labeled sample search query traffic, said labeled sample search traffic being labeled as human generated search query traffic or automatically generated search query traffic, said labeled sample search query traffic including one or more keywords for each search query submitted to said search engine and request times for a plurality of search queries submitted to said search engine within distinct user sessions;

extracting features from said labeled sample search query traffic in accordance with a set of feature definitions partitioned into physical features related to physical limitations of human generated search queries and behavioral features of automatically generated search queries and keywords of the automatically generated search queries;

generating a feature set comprising (i) said features extracted from said labeled sample search query traffic and (ii) a behavioral feature related to query word length entropy (WLE) that is calculated as:

$$WLE(l_{ij}) = -\sum_i \sum_j l_{ij} \log(l_{ij}),$$

i being an index for each separate query submitted to a search engine by a single user ID and $l_{ij}$ being a length of an individual query term j in the ith query;

generating a model using said labeled sample search query traffic and said feature set;

receiving, from said search engine, search query traffic associated with a plurality of search queries submitted by a particular user identifier;

classifying, using said model, said search query traffic associated with said plurality of search queries submitted by said particular user identifier as human generated search query traffic or automatically generated search query traffic; and modifying a quality of service provided by said search engine to said particular user identifier when said search query traffic associated with said plurality of search queries submitted by said particular user identifier is classified as automatically generated search query traffic.

2. The computer-implemented method of claim 1, further comprising:

classifying, using said model, said received search query traffic as legitimate human generated search query traffic or illegitimate human generated search query traffic.

3. The computer-implemented method of claim 1, wherein said feature set comprises a query window feature that separates a distinct user session into a plurality of discrete time periods.

4. The computer-implemented method of claim 1, further comprising:
servicing one or more search queries submitted by human users by modifying said quality of service provided by said search engine to said particular user identifier by delaying service of one or more search queries submitted by said particular user identifier.

5. The computer-implemented method of claim 1, wherein said feature set comprises a behavioral feature related to chronological search queries submitted by a single user identifier in an alphabetical order.

6. The computer-implemented method of claim 1, wherein said feature set comprises a behavioral feature related to keyword content associated with spam.

7. The computer-implemented method of claim 1, wherein said feature set comprises a behavioral feature related to keyword content associated with adult content.

8. A system for classifying search query traffic, said system comprising:
memory storing computer-executable modules including:
a feature set module that receives, from a search engine, labeled sample search query traffic and search query traffic associated with a plurality of search queries submitted by a particular user identifier, said labeled sample search traffic being labeled as human generated search query traffic or automatically generated search query traffic, said labeled sample search query traffic including one or more keywords for each search query submitted to said search engine and request times for said plurality of search queries submitted to said search engine within distinct user sessions, said feature set module extracting features from said labeled sample search query traffic in accordance with a set of feature definitions partitioned into physical features related to physical limitations of human generated search queries and behavioral features of automatically generated search queries and keywords of the automatically generated search queries, said feature set module generating a feature set comprising said features extracted from said labeled sample search query traffic;
a classifier module that builds a model using said labeled sample search query traffic and said feature set, said classifier module using the model to classify said search query traffic associated with a said plurality of search queries submitted by said particular user identifier as human generated search query traffic or automatically generated search query traffic; and
a quality of service module that changes a quality of service provided by said search engine to said particular user identifier when said search query traffic associated with said plurality of search queries submitted by said particular user identifier is classified as automatically generated search query traffic; and
a processor that executes said computer-executable modules stored in said memory,
wherein said feature set comprises a behavioral feature related to query word length entropy (WLE) that is calculated as:

$$WLE(l_{ij}) = -\sum_i \sum_j l_{ij} \log(l_{ij}), \text{ and}$$

wherein i is an index for each separate query submitted to a search engine by a single user ID and $I_{ij}$ a length of an individual query term j in the ith query.

9. The system of claim 8, wherein said classifier module uses said model to classify said search query traffic associated with said plurality of search queries submitted by said particular user identifier as legitimate human generated search query traffic or illegitimate human generated search query traffic.

10. The system of claim 8, wherein said feature set comprises a behavioral feature related to number of open browser identifiers.

11. The system of claim 8, wherein said feature set comprises a behavioral feature related to request time periodicity of automatically generated search queries.

12. The system of claim 8, wherein said feature set comprises a behavioral feature related to entropy of categories associated with single user identifier.

13. The system of claim 8, wherein said feature set comprises a behavioral feature related to one or more of blacklisted IP addresses, blacklisted user agents and particular country codes.

14. The system of claim 8, wherein said feature set comprises a query window feature that separates a distinct user session into a plurality of discrete time periods.

15. A computer-readable storage medium storing computer-executable instructions that, when executed, cause a computer system to perform a method for classifying search query traffic, said method comprising:
receiving, from a search engine, labeled sample search query traffic, said labeled sample search traffic being labeled as human generated search query traffic or automatically generated search query traffic, said labeled sample search query traffic including one or more keywords for each search query submitted to said search engine and request times for a plurality of search queries submitted to said search engine within distinct user sessions;
extracting features from said labeled sample search query traffic in accordance with a set of feature definitions partitioned into physical features related to physical limitations of human generated search queries and behavioral features of automatically generated search queries and keywords of the automatically generated search queries;
generating a feature set comprising (i) said features extracted from said labeled sample search query traffic and (ii) a behavioral feature related to query word length entropy (WLE) that is calculated as:

$$WLE(l_{ij}) = -\sum_i \sum_j l_{ij} \log(l_{ij}),$$

i being an index for each separate query submitted to a search engine by a single user ID and $I_{ij}$ being a length of an individual query term j in the ith query;
generating a model using said labeled sample search query traffic and said feature set;

receiving, from said search engine, search query traffic associated with a plurality of search queries submitted by a particular user identifier;

classifying, using said model, said search query traffic associated with said plurality of search queries submitted by said particular user identifier as human generated search query traffic or automatically generated search query traffic; and altering a quality of service provided by said search engine to said user identifier when said search query traffic associated with said plurality of search queries submitted by said particular user identifier is classified as automatically generated search query traffic.

16. The computer-readable storage medium of claim 15, wherein said feature set comprises a behavioral feature related to number of open browser identifiers.

17. The computer-readable storage medium of claim 15, wherein said feature set comprises a behavioral feature related to a click-through rate of query results.

18. The computer-readable storage medium of claim 15, wherein said feature set comprises a behavioral feature related to a program specified field identifying a program source.

* * * * *